United States Patent [19]
Darrah, III et al.

[11] 3,869,843
[45] Mar. 11, 1975

[54] LIGHTWEIGHT PLASTIC CONTAINER CASE-PACKING METHOD AND APPARATUS

[75] Inventors: John W. Darrah, III, South Windsor, Conn.; Dick W. Williams, Creve Coeur, Mo.

[73] Assignee: Monsanto Company, St. Louis, Mo.

[22] Filed: Mar. 13, 1974

[21] Appl. No.: 450,557

[52] U.S. Cl.............................. 53/26, 53/35, 53/63, 53/166, 53/246, 53/247
[51] Int. Cl........................ B65b 21/06, B65b 35/54
[58] Field of Search.......... 53/26, 35, 63, 159, 160, 53/164, 166, 237, 246, 247, 248; 302/2 R, 9, 10, 28, 59, 66

[56] References Cited
UNITED STATES PATENTS

| | | | |
|---|---|---|---|
| 1,841,451 | 1/1932 | Pope | 53/246 |
| 3,105,720 | 10/1963 | Barker | 302/2 R |
| 3,198,581 | 8/1965 | Gamberini | 302/2 R |
| 3,513,619 | 5/1970 | Kochalski et al. | 53/236 X |
| 3,775,941 | 12/1973 | Bross | 53/246 |

*Primary Examiner*—Robert L. Spruill
*Attorney, Agent, or Firm*—Michael J. Murphy

[57] ABSTRACT

In apparatus for case-packing lightweight plastic containers comprising a packing frame having a plurality of rows of pockets for receiving such containers and means for discharging the containers from the rows into cells in the case, the combination is provided therewith of a plurality of vertically oriented container-accumulating tubes above the pockets in the frame and means associated with the tubes for cyclically releasing layers of containers from the tubes to the pockets. The method involves accumulating the containers in end to end relationship in the tubes and cyclically releasing single layers from the tubes to the pockets. The containers are preferably air conveyed to the tubes from an upstream work station.

12 Claims, 15 Drawing Figures

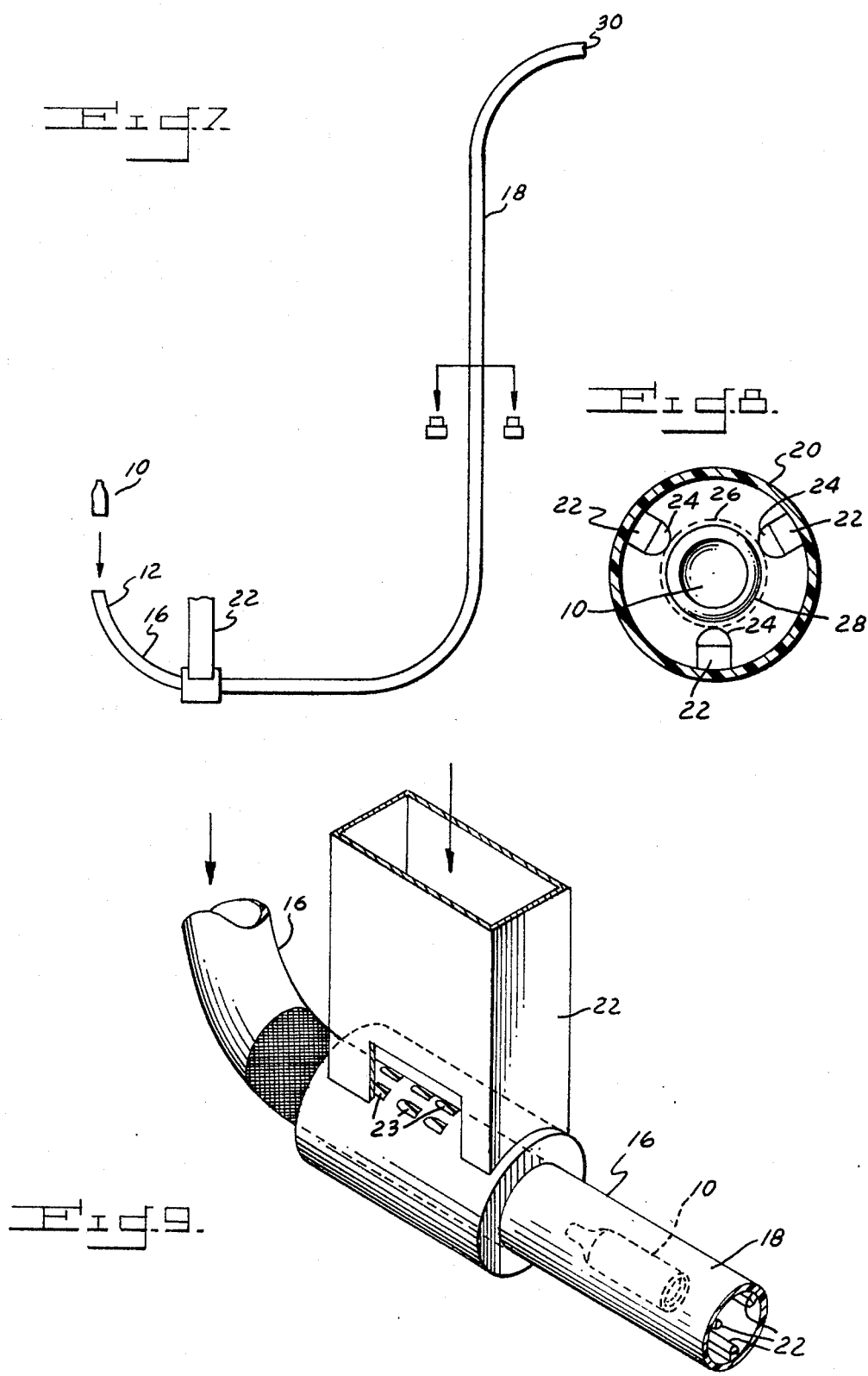

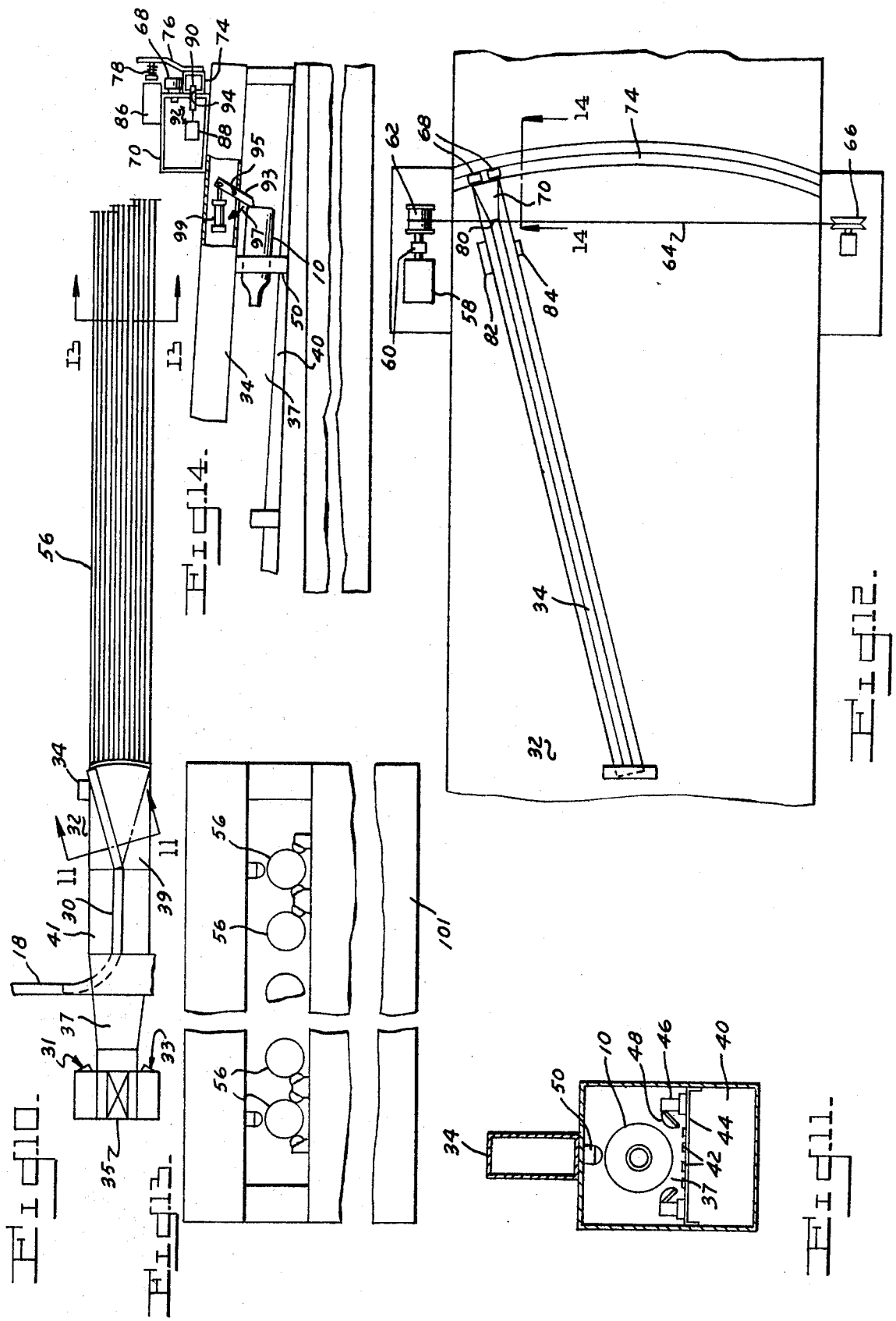

LIGHTWEIGHT PLASTIC CONTAINER CASE-PACKING METHOD AND APPARATUS

BACKGROUND OF THE INVENTION

This invention relates to case-packing lightweight plastic articles such as hollow containers, for example bottles, and more particularly to accumulating and handling such articles immediately upstream of a case-packing machine.

Machines for systematically depositing containers, such as glass bottles, in individual cells or compartments of a case or shipping carton are well established in the art and generally involve assembling a number of rows of such bottles in a frame or grid having a series of pockets corresponding to the numbers of cells in the case, and then ejecting the bottles downwardly into the cells either at the initial loading position of the frame or alternatively after shunting the frame laterally to an adjacent unloading station, the latter occurring usually while a second frame is being filled at the loading station or while a second charge of bottles is being accumulated for insertion into the pockets when the single frame returns to its initial position. Such a packout system is typically shown in U.S. Pat. No. 3,273,308.

As shown, for example in U.S. Pat. No. 2,890,553, it is also well established to feed such installations from one or more sources by means of horizontally oriented flat link, straight line conveyors on which the bottles rest on their bases in upright position. When more than one source of bottles exists, a conveyor from each such source frequently feeds a wider one supplying the packout installation, with some type of accumulating means usually provided for collecting the bottles, or for accommodating either a change in the rate of container flow between first and second conveyor means, or a change in speed of one conveyor or another. It is possible, for example, for movement of the containers to be slowed or stopped for some reason such as during packout of a container group into the shipping carton, so that there is a temporary accumulation at the infeed end of the removal conveyor. At the same time there may be differences in the supply rate and possible gaps in the flow of containers from the container feed means. Such accumulating means usually depend on the accumulated containers being pushed forward by rearward contact with the succeeding containers issuing from the upstream area. Diverter plates to angularly guide the bottles in one direction or another are also frequently employed in these types of container handling systems.

This overall approach functions well when the containers have previously been filled and are therefore somewhat heavy and stable in the vertical upright position or when they are the relatively thick-walled glass variety. Countless problems occur, however, when containers such as empty, narrow necked bottles made of relatively lightweight, thin-walled thermoplastic material are put through these systems. For example, some lightweight plastic bottles weigh only one-half as much as their glass counterparts of the same volume, and when such prior art systems as discussed above are employed with these plastic containers, one such container abutting against another more frequently than not will cause the first to topple over, which usually sets off a chain reaction leading to a substantial jamming problem of the entire system requiring considerable downtime for clearing. Also, scuffing of the surfaces of the plastic bottles at points of contact along their length can occur when one rubs against another in these handling systems.

To the best of our knowledge, prior to the present invention, the prior art has tolerated this problem, or alternatively the bottles have been removed from the conveyor surface by human operators and manually placed in the shipping cartons.

SUMMARY OF THE INVENTION

Now, however, there has been developed an improved system for accommodating lightweight plastic containers such as bottles being packaged in cartons by case-filling machines.

Accordingly, it is a principle object of this invention to provide method and apparatus for handling lightweight plastic containers immediately upstream of a case-packing station.

Another object of this invention is to provide method and apparatus for accommodating lightweight plastic bottles in bulk upstream of a case-packing machine while avoiding prior art container-toppling problems.

A specific object of this invention is to provide a system to positively capture each individual lightweight container to be packed into a cell of a shipping carton from the point where it is discharged from the last upstream work station before the packout machine through the point when it rests in its individual carton cell.

An additional object of this invention is to provide dispensing apparatus supplying a case-packing machine especially adapted for accommodating lightweight plastic bottles.

Other objects of this invention will in part be obvious and will in part appear hereinafter.

These and other objects are accomplished in apparatus for case-packing lightweight plastic containers comprising a packing frame having a plurality of rows of pockets for receiving such containers and means for discharging the containers from the rows into cells formed in the case by providing the combination therewith of a plurality of vertically oriented container-accumulating tubes above the pockets in the frame and means associated with the tubes for cyclically releasing layers of containers from the tubes to the frame pockets.

Also provided in the process for case-packing lightweight plastic containers which involves receiving the containers in a plurality of rows of pockets in a packing frame adjacent the case and then simultaneously ejecting the containers from the rows into cells in the case, is the combination therewith of the steps of accumulating the containers in end-to-end relationship in tubes above the packing frame and cyclically releasing single layers of the containers from the tubes to the pockets.

BRIEF DESCRIPTION OF THE DRAWINGS

In describing the overall invention, reference will be made to accompanying drawings wherein:

FIG. 7 is a vertical, elevational view of an upstream conveyor associated with the apparatus of FIG. 1;

FIG. 8 is a schematic, sectional view through 8—8 of FIG. 7;

FIG. 9 is a schematic view of a portion of the apparatus of FIG. 7;

FIG. 10 is a plan view of the next downstream portion of the system subsequent to that of FIG. 7;

FIG. 11 is a sectional view along 11—11 of FIG. 10;

FIG. 12 is an enlarged schematic view of a further portion of the apparatus of FIG. 10;

FIG. 13 is a sectional view along 13—13 of FIG. 10;

FIG. 14 is an elevational view along 14—14 of FIG. 12; and

DETAILED DESCRIPTION OF ILLUSTRATED EMBODIMENTS

Figure 1:
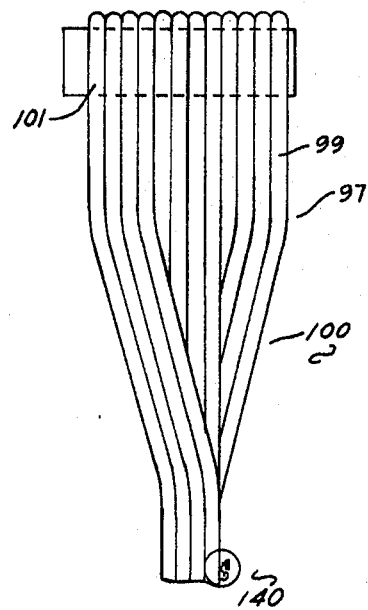
FIG. 1 is a vertical elevational view of the bottle accumulating portion of the apparatus of the invention.
Figure 2:
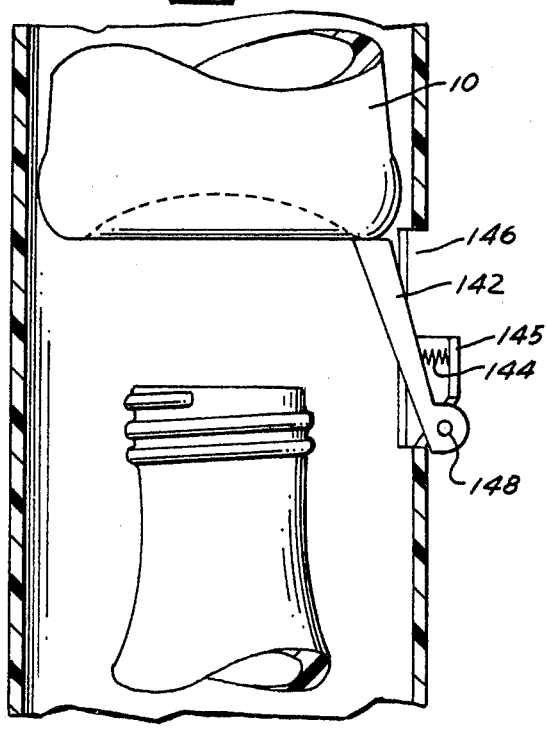
FIG. 2 is an enlarged, partial, vertical section of a portion of the apparatus of FIG. 1.

Referring now to the drawings, and initially to FIG. 1, there is illustrated a plurality of vertically oriented, bottle accumulating tubes 100 merging together downwardly in a twisting pattern from the lower ends at 97 of a series of adjacent large radius 90° elbow portions 99 to a closely packed, rectangular grouping of three vertical rows and four horizontal rows supplying a bottle packout station. In the illustrated embodiment, elbows 99 form a transition between horizontally extending lanes 56 (FIG. 10) and vertically oriented tubes 100. Though twelve such tubes 100 are shown, obviously any number may be used and this is usually determined by the number of cells in the case to be packed, in a manner to be described. Accumulator tubes 100 may be formed of any suitable material such as metal or plastic, wherein the inside open cross section, as illustrated in FIG. 2, is slightly larger than a bottle 10, but the preferred form is illustrated in FIG. 8. As there shown, each tube 100 comprises cylindrical plastic housing 20 provided with fixed, interior, longitudinal extending supports 22 spaced equidistantly from each other, (e.g., at 120°) around the internal circumference of housing 20. Bumpers 24 secured to supports 22 circumscribe between them a substantially cylindrical passage, illustrated via dotted line 26, incrementally larger than the maximum diameter 28 of each bottle 10 passing therethrough. This passage is sized to allow containers 10 to pass downwardly single file between bumpers 24, preferably only under the influence of gravity.

Figure 3:
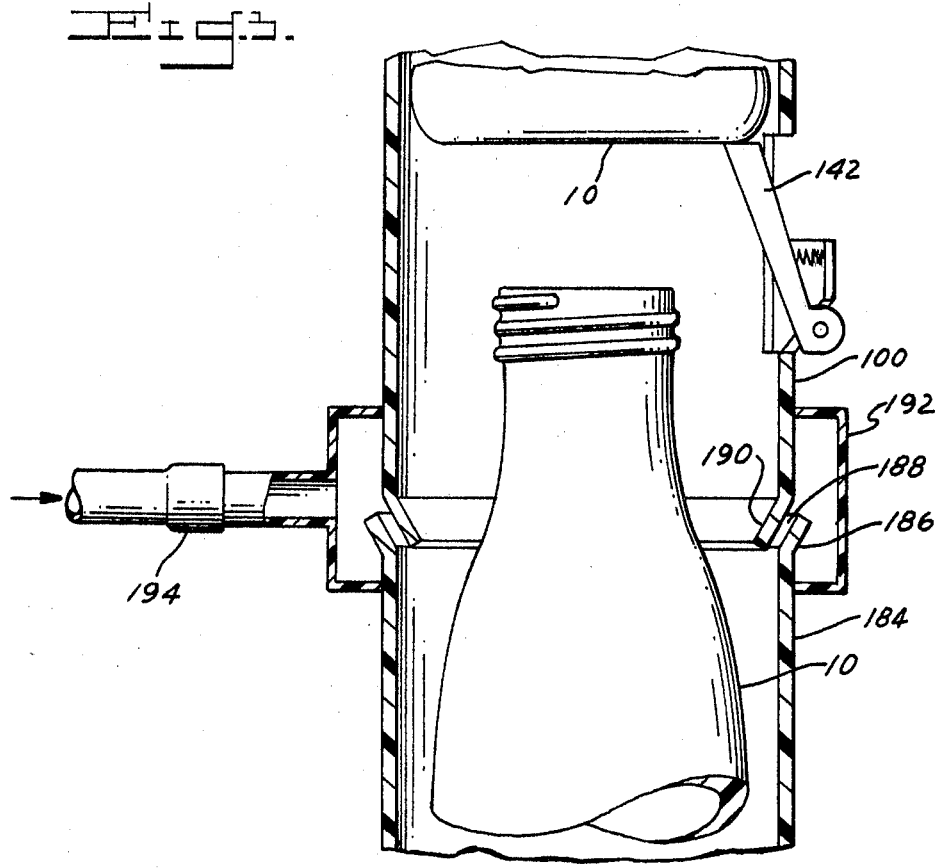
FIG. 3 is an alternative embodiment of the portion of the apparatus depicted in FIG. 2.
Figure 4:
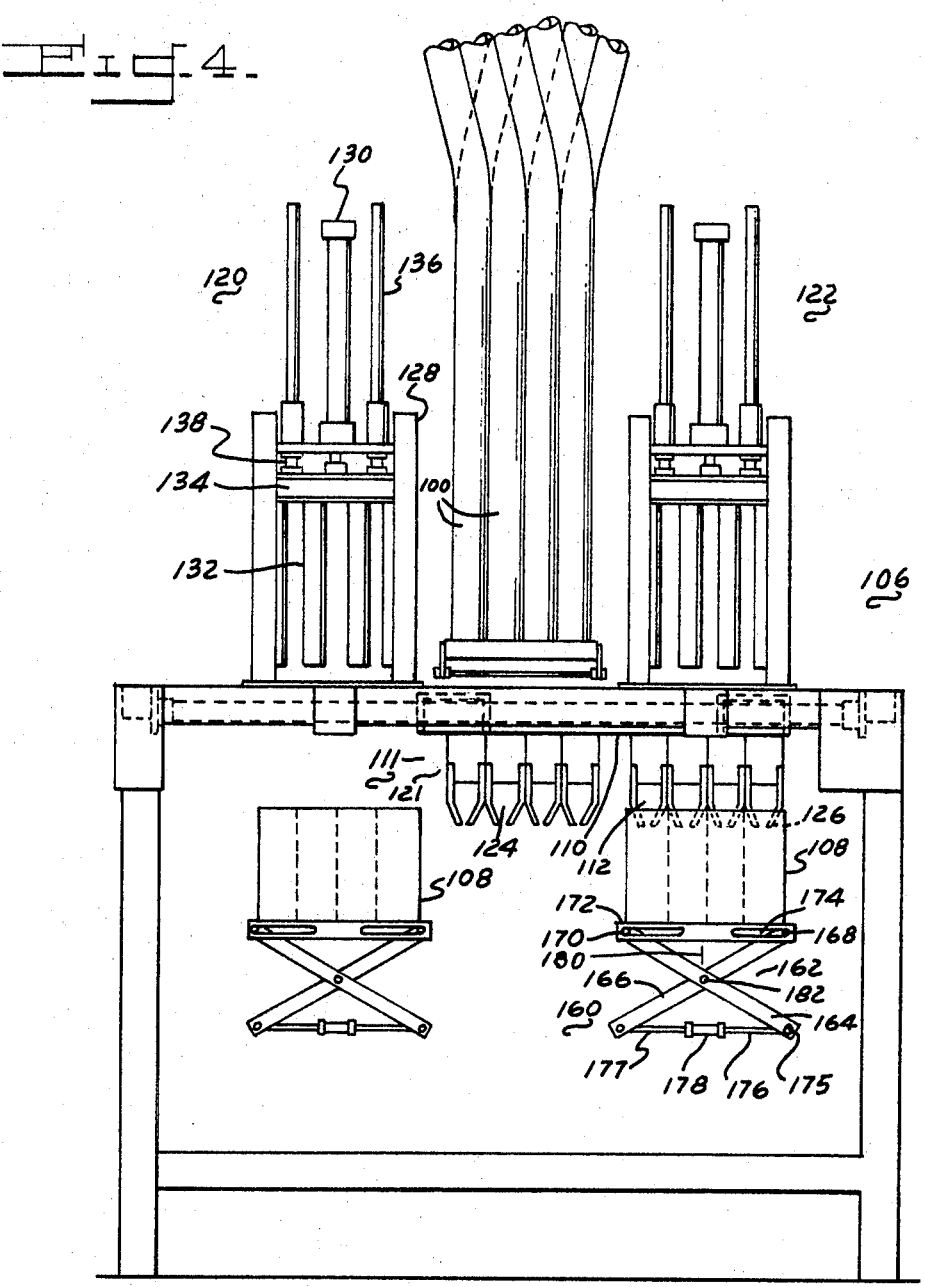
FIG. 4 is a front, elevational view of a bottle packout apparatus embodying the invention.
Figure 15:
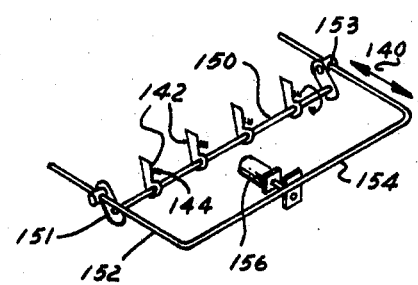
FIG. 15 is a partial, perspective view of the finger actuating mechanism of FIGS. 2 and 5.

Referring now to FIGS. 2-6, apparatus generally indicated as 106 is provided for case-packing lightweight plastic containers 10 into cells conventionally formed via suitable cardboard dividers, in cartons 108 in a well-known manner. Apparatus 106 comprises packing frame 110 having a plurality of vertical 96 and horizontal rows 98 (FIG. 5) of pockets 112 formed therein for receiving containers 10 prior to depositing them in the cells of a carton 108. In the illustrated embodiment, packing frame 110 is journaled at four places 114 for lateral, reciprocable movement along rails 116, 118 from its loading station 111, directly vertically beneath the lower ends of tubes 100, as illustrated in FIG. 4, to adjacent, bottle discharge stations 120 and 122. In the illustrated embodiment, frame 110 is provided with duplicate, identical sets of pockets for the bottles in a relatively conventional manner, so that while bottles in the first group of pockets 112 are being discharged at station 122, the second group of pockets 124 are being filled from tubes 100 at station 111 in a manner to be described. Each pocket in both groups of rows 96, 98 converges inwardly at its lower end via spring steel fingers 126 in a relatively conventional manner to form a bottom discharge opening which is incrementally slightly smaller in diameter than that of the body of a bottle when the latter are seated in the pockets, but which can be slightly enlarged to permit ejecting the bottles when fingers 126 are forced outwardly. Each pocket in both groups 112, 124 further is coaxial with the lower outlet end of a tube 100 when that particular group in packing frame 110 is in loading station 111.

Each bottle discharge station 120, 122 includes identical means for discharging containers 10 from the pockets into the cells of a case 108 and only one such means will be described in detail. Such means in FIGS. 4-6 includes a stand 128, a fluid motor 130, plunger or piston portions 132 equal in number to one set of pockets in frame 110 and which are secured to horizontal support 134, which in turn is carried on the forward end of fluid motor 130. Vertically oriented hollow guides 136 slidably receive piston portions 132 when in their upwardly retracted position, with a piston 132 being coaxial with a pocket in frame 110 when the latter is situated in stations 120 and 122. Alternative means to the structure just described may be used to discharge containers from the pockets into the cells of the case, such as suitably actuated pulsed pressurized air.

Figure 5:
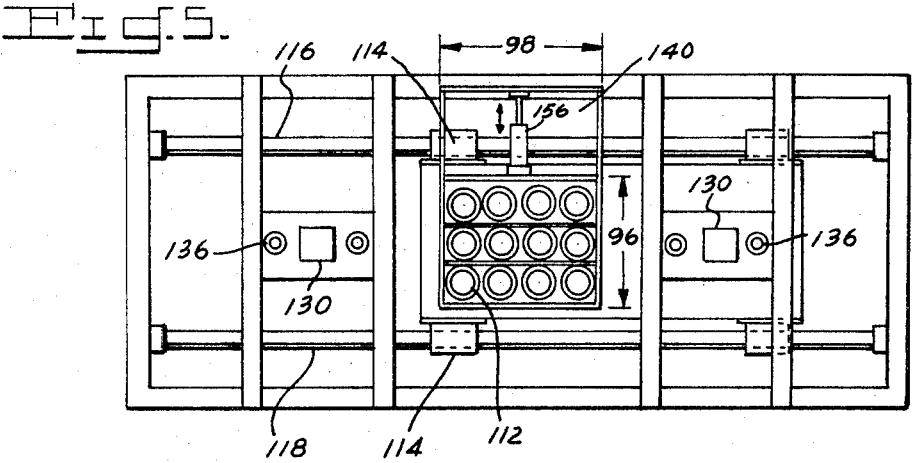
FIG. 5 is a plan view of the apparatus of FIG. 4.
Figure 6:
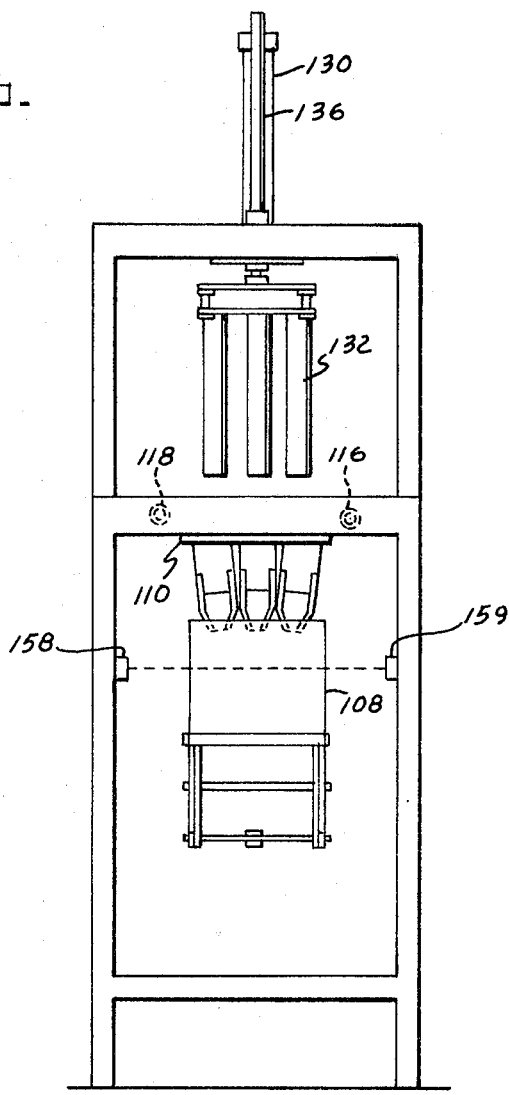
FIG. 6 is a side elevational view of the apparatus of FIG. 4.

Turning to FIGS. 2, 3, 5 and 15, in accordance with the principles of the invention, each accumulator tube 100 has means, generally indicated as 140, adjacent the lower end thereof for cyclically releasing single layers of bottles 10 from tubes 100 into pockets 112, 124 of frame 110. Such layer in total comprises the exact number of bottles as the number of pockets in a set 112, 124 which, in the illustrated embodiment, amounts to 12. Means 140 (FIGS. 2 and 15) comprises a stop finger 142 biased via compression spring 144 secured to clip 145 into the open cross section of each tube 100 through a slot 146 in its wall. Each finger 142 in a row is fixed at 148 to blade 150, which blades in the illustrated embodiment extend crosswise in the direction of rows 98 (FIG. 5). Link members 151 at each end of a blade 150 (FIG. 15) are fixed at one end to a blade 150 and pivoted at their other end 153 to rigid member 152 extending in the vertical direction in FIG. 5, the latter being joined to cross bar 154 which in turn is connected to fluid motor 156 which serves as an actuating means, (via member 152, bar 154 and link members 151), for simultaneously imparting pivotal movement to fingers 142 into and out of the interior of each tube 100 during a cycle of the apparatus. Means, such as an industrially available conventional electric eye 158 and receiver 159 (FIG. 6) are provided which, in conjunction with conventional sequencing control circuitry, is responsive to the presence of a carton 108 beneath discharge station 120 or 122 to allow said actuating means 156 to operate.

A suitable case elevating mechanism, generally illustratively indicated as 160 in FIG. 4 may be provided beneath each bottle discharge station 120, 122 and may comprise scissors assembly 162 having a pair of arms 164 and 166 horizontally slidably secured at one end of each at 168 and 170 to platform 172 in slots 174 and at the other end to piston rod portions 176 and 177 of double acting fluid motor 178. By manipulating pressurized air to motor 178 in conventional manner, arm 164 may be pulled toward central plane 180 to cause it and therefore driven arm 166 to pivot about 182 toward plane 180 thereby elevating platform 172. By reversing this procedure the lower end of arm 164 below pivot 182 may be forced horizontally to the right about pivot 175, thereby collapsing scissors assembly 162 to reduce the elevation of the shipping carton 108 after filling. Other types of devices may also be used to raise and lower cartons in stations 120, 122 as may conventional sensing switches connected into the machine circuitry to actuate such devices automatically in response to a filled or empty condition of the case. Also, it will be obvious that cartons 108 may be placed on and removed from such raising and lowering devices either manually or automatically.

In operation of case-packing apparatus 106, assume a series of bottles 10 have been vertically accumulated in base to neck fashion as illustrated in FIG. 2, within each of accumulator tubes 100 in a manner to be further described hereafter, and that each finger 142 is in its blocking position as in FIG. 2. When eye or switch 158 senses the presence of carton 108, for example beneath bottle discharge station 122, fluid motor 156 (FIG. 5) is actuated to draw, (via the previously described intermediate members of FIG. 15) each finger 142 to the right in slot 146 at the bottom of each tube 100 for a fraction of a second sufficient to allow the lowermost layer of bottles 10, comprising the last one in each tube 100 to drop by gravity into the rows of pockets 124 in packing frame 110 and against inwardly directed fingers 126. Motor 156 is then reversed after such fraction of a second to cause its internal piston (not shown) to move in the opposite direction thereby causing fingers 142 to again enter the cross sectional opening of the tubes under the influence of springs 144 to thereby impede the downward drop of the next layer of bottles. In such position of the fingers, the upper end of each abuts the base of a bottle while the upper portion of the bottle in a tube rests against the wall thereof or against one or more of the previously described bumpers 24. Frame 110 is then caused, by suitable conventional means such as an electric motor and speed reduction system, not shown, to shuttle laterally, for example to the left in FIG. 4 until pockets 124 are beneath each of piston portions 132 in discharge station 120. Fluid motor 130 is then actuated via a conventional control signal to drive pistons 132 downwardly against the upper surface at the end of each bottle neck to simultaneously physically eject or force each bottle through converging fingers 126 out of the packing frame into the aligned cells of the case 108 situated vertically below. Motor 130 is then reversed to retract piston portions 132, scissors assembly 162 is collapsed as previously described to lower the packed case from beneath the discharge station whereupon it is replaced on platform 172 with another case. Frame 110 is then shuttled in the opposite direction in FIG. 4 where a layer of bottles which had been cyclically inserted into the pockets of the other portion of the frame 110 while those just described were being packed out are then packaged in the same manner in a case situated beneath discharge station 122.

In the embodiment of the invention illustrated in FIG. 3, the means for discharging containers into the cells of the shipping carton is vertically positioned between the pockets of the packing frame and the lower discharge ends of the plurality of tubes 100 and basically is in the form of an extension of such tubes. Such means comprises an enclosure 184 at the bottom of each accumulator tube 100, the latter being constructed, vertically oriented, and provided with a stop finger 142 above enclosure 184, in the manner previously described with respect to FIG. 2. Enclosure 184 acts as an extension of each tube 100 and forms a slot 188 via flared portion 186 at its upper end with the lower end 190 of each accumulator tube 100, which lower end 190 may be turned inwardly as illustrated. Housing 192 around each slot 188 is associated with pressurized air means which includes conduit 194, for cyclically charging air under pressure to enclosure 184 to force bottles 10, which have been previously released via stop fingers 142 into lower pockets and eventually out into cells of a shipping carton in the manner previously described. Pressurized air passing through conduit 194 is conventionally timed and synchronized with the remainder of the system so as to enter enclosure 184 at the proper point in the cycle of the equipment after the layer of bottles have been released to the lower packing frame, not shown. Spent air in this embodiment may flow out the bottom of enclosure 184 or pass upwardly around the bottles accumulated in tubes 100 for eventual venting at the top. It may also be necessary to coordinate such pressurized air as just described with a suitable means such as a mechanical linkage or another pressurized air circuit to positively open the converging fingers forming the bottle pockets outwardly at the point in the cycle when it is desired to eject the containers into the cells of the carton. In this embodiment of FIG. 3, a laterally reciprocable shuttle system is avoided and packout occurs in direct vertical alignment with the bottle accumulator tubes of the invention.

Though the vertical rise of each of the accumulator tubes 100 of the invention may vary within wide limits, as illustrated in FIG. 1, it is preferred that such rise be at least equal to three times the height of one container 10 in order to achieve the bulk storage objective of the invention, and most preferably such rise is at least three feet in height.

Referring now to FIGS. 7-14, there is shown a preferred means for conveying bottles 10 from an upstream station, not shown, to the bottle accumulating tubes 100 of the invention. Though other means may be utilized, the preferred approach is based on the principle of air conveying and is generally described in U.S. Pat. No. 3,131,974 to R. E. Futer. Such an air conveying system, as will now be described, is known and generally available in the industry from Futerized Systems, Inc., 235 West MacArthur Blvd., Suite 600, Oakland, Calif. 94611.

Empty, lightweight plastic bottles 10 (FIG. 7), as previously described, are successively presented by any suitable means, either manual or automatic, to feed end 12 of a pneumatic bottle-conveying tube which is preferably situated immediately adjacent the last upstream work station from which bottle 10 has issued. Such conveying tube comprises initial portion 16 and discharge portion 18 which may rise vertically as illustrated in FIG. 7, depending on the availability of space.

Initial portion 16 is preferably under a slight negative pressure in order to draw the lightweight bottles 10 into the conveying system. Such negative pressure may be generated by a suitable conventional blower (not shown) drawing air in from the surroundings and discharging it through shroud 22 into a suitable cylindrically oriented nozzle assembly designed to create a venturi effect via passage of the air entering the system through forwardly oriented ports 23, which in turn generates a partial upstream vacuum in tube portion 16 and a positive conveying pressure in portion 18 downstream of such shroud. Bottles 10 forced by the pressure thus generated then move base first consecutively through portion 18 which internally is as previously described and shown in FIG. 8.

Bottles issuing from discharge portion 18 are fed to the next horizontally oriented portion of the conveying system (FIG. 10) which is based on the open topped "air-belt" conveying concept described in U.S. Pat. No. 3,131,974. Low pressure air is drawn in through duct openings 31, 33 by a suitable fan schematically shown at 35 and discharged through duct 37 to the air belt conveying system. Diverter means, generally shown at 32 (FIG. 12), divides the flow of bottles 10 issuing from initial air slide conveying portion 30, into a series of lanes 56 corresponding in number to the accumulator tubes 100 and to the cells in the shipping case in which the bottles will eventually be packaged, as previously described. These lanes may vary in number with twelve being schematically illustrated in FIG. 10. Diverter means 32 is old in the art and is here described for purposes of completeness. Means 32 comprises elongated arm 34 (FIG. 12) having an "air belt" bottle conveying portion as most particularly illustrated in FIG. 11. Such an air belt conveyor comprises a source of low pressure air in this instance supplied by fan 35 discharging through duct portion 37 and then to closed plenum portion 40 (FIG. 11) which includes floor portion 44 having forwardly directed air discharge slots 42 cut therein through which pressurized air issues so as to float and advance bottles 10 through the slightly downwardly sloping diverter means toward the right in FIG. 10. Suitable guide rails 46 carry angularly spaced bumper portions 48 constructed as previously described, which rails are secured along their length to floor portion 44, with one top row secured to a series of spaced inverted U-shaped clips 50 which are mounted, for example by welding, to arm 34. Thus, each bottle 10 passing lengthwise beneath arm 34 moves in the space illustrated as 37 in FIG. 11. It should be realized that the pressurized conveying air issuing through openings 42 conveniently escapes to the surroundings since the area above floor 44 is open except for spaced clips 50. Plenum portion 40 of diverter means 32 communicates via a suitable flexible connection with the inside of duct portion 41 so as to receive the conveying air.

With respect to FIG. 12, diverter means 32 further includes a reversing motor 58 coupled to electromagnetic clutch 60 which in turn is rotatably connected to drum 62 around which endless cable 64 is wound and which extends between drum 62 and driven pulley 66 adjacent the horizontally lowermost lane in FIG. 10. Arm 34 at its discharge end (FIG. 14) has a pair of followers 68 rotatably journaled in bracket 70 secured to the top surface of arm 34. During stepwise travel of arm 34 between lanes 56, followers 68 roll along an arcuate track formed by rectangular tubing 74 (FIG. 14) which is stationarily positioned via suitable conventional supports (not shown). Sensing flange 76 having adjustably positioned bolt 78 projecting therefrom is in turn fastened on the forward face of tubing 74. Diverter arm 34 is secured at 80 to cable 64 and has a suitable instrument sensor schematically illustrated at 82 mounted on one side and a receiver similarly illustrated at 84 on the opposite side for counting the number of bottles which are consecutively conveyed therethrough. Switch 86 atop bracket 70 cooperates in a manner to be described with adjustable bolts 78 with one each of the latter being vertically aligned above one of the horizontal runs or lanes 56. Solenoid switch 88 on bracket 70 operates latch bar 90 (FIG. 14) back and forth in the direction of arrow 92 in and out of spaced openings 94 formed in tubing 74 above each of the horizontal lanes 56. Link 93 pivotable about 95 in the direction of arrow 97 on actuation by double acting solenoid 99 blocks conveying path 37 along the diverter means 32 when arm 34 is indexing between lanes 56.

Regarding operation of diverter means 32, and assuming it to be in the uppermost position in FIGS. 10 and 12 feeding the top lane 56, bottles 10 passing therethrough are mechanically counted via sensor-receiver combination 82-84 and when a preset number is reached, which is that desired to be fed to a particular lane 56 at one time, a suitable conventional control signal is generated by the counter to energize clutch 60 to transmit rotary power from continuously operating reversing motor 58 to rotatable drum 62. Diverter arm 34 secured at 80 to cable 64 is then moved downwardly in FIG. 10 via followers 68 toward the next lane 56 until switch 86 approaches bolt 78 which breaks contact to deenergize clutch 60 and cut off power to drum 62, thereby halting movement of diverter means 32. At the same time solenoid 88 is actuated to drive latch bar 90 into the opposing hole 94 in tubing 74 to lock the diverter arm in alignment with the next tube being fed, as is solenoid 99 energized to raise link member 93 out of the conveying path 37. When the preset number of bottles has been fed to this next tube, latch bar 90 is automatically retracted, link member 93 pivoted downwardly, clutch 60 energized and diverter means 32 driven to the next horizontal run in the system. When the lowermost lane in FIG. 10 has been fed, motor 58 reverses rotation via a suitable control signal and the next uppermost lane is charged as described, or else the arm can travel all the way back to the first horizontally uppermost lane previously described.

Further movement of the bottles 10 toward tubes 100 continues by means of the previously described air conveying concept with air issuing upwardly from downstream duct 101 (FIG. 13) through suitable conveying slots beneath each lane 56, such duct 101, as illustrated in FIG. 10, being flanged directly to upstream supply plenum 39.

For purposes of this invention, the lightweight plastic containers processable as herein described may be filled with contents if sufficiently small in size or light in weight as not to crush each other when accumulated in a column upstream of the packout station, but preferably are empty. Similarly, though the container contour may vary widely, the preferred shape, in order to cooperate with the stop fingers at the bases of the accumulator tubes, is that of a bottle sloping inwardly from the major body diameter toward its open end to form a neck reduced in diameter on the order of 50 percent or less with respect to the main body portion, and are preferably characterized as weighing from 0.03 to 0.13 grams per cubic centimeter of internal volume. Such bottles may be of the horizontally oriented flat base type or may have a raised base to accommodate internal pressure after filling. Either of the latter versions is readily handled with the system of the present invention.

The above description and particularly the drawings are set forth for purposes of illustration only and are not to be taken in a limited sense. Various modifications and alterations will be readily suggested to persons skilled in the art. It is intended, therefore, that the foregoing be considered as exemplary only and that the scope of the invention be ascertained from the following claims.

What is claimed is:

1. In a process for case-packing lightweight plastic containers which comprises:
   A. receiving said containers in a plurality of rows of pockets in a packing frame adjacent the case; and then
   B. simultaneously ejecting the containers from the rows into cells in the case;
the combination therewith of the steps of:
   C. accumulating the containers in end to end relationship in tubes above said packing frame; and
   D. cyclically releasing single layers of said containers from the tubes to the pockets.

2. The process of claim 1 including the step of air conveying said containers, base first, from an upstream station to said tubes.

3. The process of claim 1 wherein said containers weigh from 0.03 to 0.13 grams per cubic centimeter of internal volume.

4. In apparatus for case-packing lightweight plastic containers comprising:
   A. a packing frame having a plurality of rows of pockets for receiving said containers; and
   B. means for discharging the containers from the rows into cells formed in the case;
the combination therewith of:
   C. a plurality of vertically oriented container accumulating tubes above the pockets in said frame; and
   D. means associated with the tubes for cyclically releasing layers of containers from said tubes to the pockets of said frame.

5. The apparatus of claim 4 wherein the tubes are circular and are of such dimensions as will allow said containers to pass downwardly single file through them.

6. The apparatus of claim 4 wherein one of said tubes is positioned above each of said pockets.

7. The apparatus of claim 4 wherein the height of said tubes is at least equal to three times the height of one of said containers.

8. The apparatus of claim 4 wherein said means for cyclically releasing comprises:
   a. a stop finger for each tube adjacent its lower end for movement into and out of the open cross section thereof;
   b. actuating means for simultaneously operating all of the stop fingers; and
   c. means responsive to the presence of a case beneath the means for discharging the containers into the cells to allow said actuating means to function.

9. The apparatus of claim 4 wherein said means for discharging the containers into the cells is vertically positioned between the pockets and the discharge ends of the tubes.

10. The apparatus of claim 9 wherein said means for discharging the containers comprises:
    a. an enclosure at the bottom of each tube forming a cylindrical slot with the wall of each tube; and
    b. pressurized air means communicating with each slot for cyclically charging air to the enclosure to force bottles out of the pockets into the cells.

11. In apparatus for collecting and case-packing lightweight plastic bottles having reduced diameter necks comprising:
    A. a packing frame having a plurality of rows of pockets for receiving said containers from an upstream area; and
    B. means for ejecting the bottles downwardly out of the rows of the packing frame into individual cells of a case below the frame;
the combination therewith of:
    C. a plurality of vertically oriented, bottle accumulating tubes, one end of each of said tubes being substantially coaxial with one of said pockets, each such tube extending upwardly from immediately adjacent said last mentioned pocket, each tube having a length of at least three feet and having an open cross section of such dimension as to permit passage of bottles therethrough under gravity without toppling sideways;
    D. means associated with each of said tubes for cyclically releasing a single layer of bottles from said tubes to the pockets of the frame; and
    E. pneumatic conveying means for feeding said bottles to said tubes from an upstream station.

12. In apparatus for collecting and case-packing lightweight plastic bottles comprising:
    A. a packing frame having a plurality of rows of pockets for receiving said containers at a loading station;
    B. shuttle means for laterally reciprocating said frame between said loading station and a discharge station;
    C. means above said discharge station for forcing the bottles out of the pockets into cells in the case;
the combination therewith of:
    D. a plurality of vertically oriented bottle accumulating tubes, one each of said tubes extending upwardly from adjacent a pocket in said frame when in said loading station;
    E. means at the lower end of each tube for releasing a single layer of bottles out the bottom of said tubes to the pockets of said frame; and
    F. pneumatic conveying means for feeding said bottles to said tubes from an upstream station.

* * * * *

UNITED STATES PATENT AND TRADEMARK OFFICE
CERTIFICATE OF CORRECTION

PATENT NO. : 3,869,843
DATED : March 11, 1975
INVENTOR(S) : John W. Darrah, III and Dick S. Williams It is certified that error appears in the above-identified patent and that said Letters Patent are hereby corrected as shown below:

First page, Code [75], line 2, after "Dick", delete "W" and insert - - - S - - -.

Signed and Sealed this eleventh Day of November 1975

[SEAL]

Attest:

RUTH C. MASON
*Attesting Officer*

C. MARSHALL DANN
*Commissioner of Patents and Trademarks*